United States Patent
Coggi et al.

(10) Patent No.: US 9,678,284 B2
(45) Date of Patent: Jun. 13, 2017

(54) METHOD AND DEVICE FOR CLEANING AN OPTICAL WAVEGUIDE END

(71) Applicant: Diamond SA, Losone (CH)

(72) Inventors: Victor Coggi, Losone (CH); Francois Caloz, Arcegno (CH); Dionigi Sergio Fantini, Ghirla (IT)

(73) Assignee: DIAMOND SA, Losone (CH)

( * ) Notice: Subject to any disclaimer, the term of this patent is extended or adjusted under 35 U.S.C. 154(b) by 0 days.

(21) Appl. No.: 15/209,260

(22) Filed: Jul. 13, 2016

(65) Prior Publication Data

US 2017/0017048 A1    Jan. 19, 2017

(30) Foreign Application Priority Data

Jul. 14, 2015   (CH) ...................... 1024/15

(51) Int. Cl.
    *G02B 6/38*   (2006.01)
(52) U.S. Cl.
    CPC .......... *G02B 6/3866* (2013.01); *G02B 6/3891* (2013.01); *G02B 6/3893* (2013.01)
(58) Field of Classification Search
    None
    See application file for complete search history.

(56) References Cited

U.S. PATENT DOCUMENTS

| 2008/0034519 A1 | 2/2008 | Fujiwara |
| 2011/0047731 A1 | 3/2011 | Sugita et al. |
| 2014/0259477 A1 | 9/2014 | Huang |

FOREIGN PATENT DOCUMENTS

EP    0868673 B1    8/2001

OTHER PUBLICATIONS

Office Action in the counterpart Switzerland application No. 10242015 dated Nov. 27, 2015.

*Primary Examiner* — Jerry Rahll
(74) *Attorney, Agent, or Firm* — Nath, Goldberg & Meyer; Jerald L. Meyer; Stanley N. Protigal

(57) ABSTRACT

A device (1) for cleaning an optical waveguide end (2) comprises a guide portion (3) for receiving the optical waveguide end (2) in a stable position and a rotatably mounted spool (4) onto which a flexible cleaning element (5) is wound. The guide portion (3) and the spool (4) are positioned relative to one another such that an optical waveguide end (2) received by the guide portion (3) is able to be pressed against the wound cleaning element (5). The cleaning element (5) is able to be unwound from the spool (4) such that different portions of the cleaning element (5) are able to be applied to the optical waveguide end (2) during unwinding.

13 Claims, 3 Drawing Sheets

METHOD AND DEVICE FOR CLEANING AN OPTICAL WAVEGUIDE END

Figure 1:
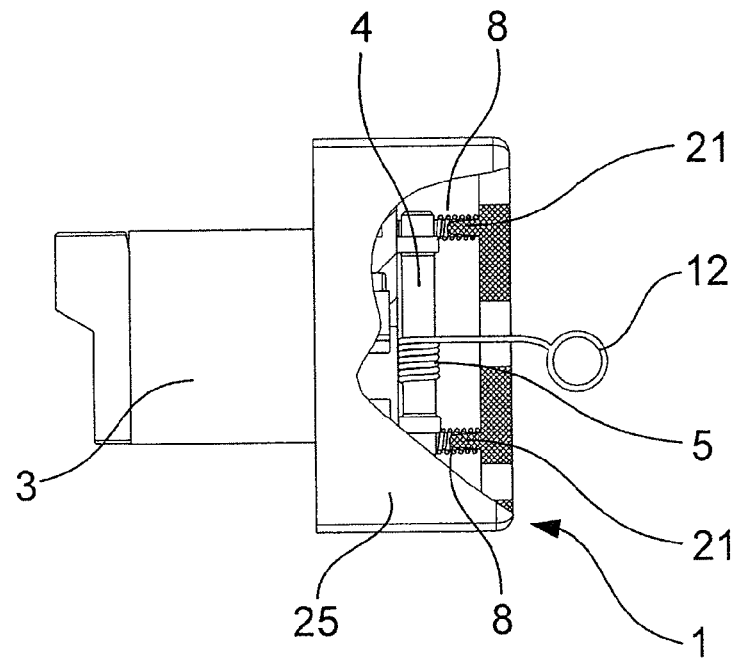

The present invention relates to a method and a system for producing an optical waveguide plug connection, to a method and a device for cleaning an optical waveguide end, and to an optical waveguide plug for an optical waveguide plug connection, according to the preambles of the independent claims.

Optical waveguides (OWG) or optical cables (OC) are used widely in the medical sector. For the one part, they are used for illumination and imaging purposes in endoscopes. For the other part, optical cables are used to transfer energy, for example for the flexible transportation of laser radiation in surgical devices. However, optical waveguides are also used in diagnostics as a component of fiber optic sensors on spectrometers and other optical measuring devices. Last but not least, however, the significance of data transmission via optical waveguides has increased significantly in recent times in the medical field.

Particular adaptations are required when optical waveguides are used in sterile applications. Thus, optical waveguide cables and plugs, which are attached for example to endoscopes, have to be such that they can be subjected to sterilization during the preparation of a surgical instrument for an operation. Specific requirements are imposed on cable sheathings and plugs in this connection. Thus, such cables have to be easy to handle both outside and inside the patient, have to have good biocompatibility, and nevertheless have to be able to withstand the influence of cleaning and sterilizing agents, for example steam or disinfectants, over a large number of cycles.

High demands are also placed on the plugs that are used. In addition to light transmission that has as little attenuation as possible, easy handling, in particular with regard to the cleaning and sterilization thereof, is desired. Furthermore, with regard to hygiene, the impermeability of the transition from the plug housing to the cable sheath is important. WO 94/26160 describes in this connection an electro-optical cable which is preassembled with a plug and is suitable for steam and liquid sterilization.

A general problem in the production of optical waveguide plug connections in virtually all fields of application is the cleanliness of the optical waveguide end to be connected. Accordingly, a large number of different cleaning systems for optical waveguide ends are available. Thus, US 2011/0154599 A1 describes for example a cleaning device for optical plug connectors which comprises a guide portion for aligning a plug pin exactly with an optical waveguide end.

Optical waveguide plug connectors are specific plug connectors for detachably connecting optical waveguides. Optical waveguides can be connected together or to further optical components via such plug connectors. In telecommunications, these are usually transmitters, receivers or amplifiers. In measurement technology, spectroscopy or medical technology, these are usually laser devices, light sensors or radiation detectors. The plugs used have to have as little signal attenuation as possible and high return loss, and good reproducibility or maintenance of these parameters over a large number of connection cycles. A number of different plug standards have become established over time in the different fields of application. Thus, WO 2008/095798 A1, for example, describes plug parts for an optical plug connection, in the case of which a pin holder preassembled on a cable and having a plug pin can be inserted into a plug housing from the rear.

A drawback of known systems is that optical waveguide plug connectors, in particular those for data transmission, are not generally suitable for sterile applications. Thus, the conventional plug systems are not intended to be exposed to aggressive cleaning and sterilization conditions. The plug parts are furthermore not designed for handling in a clinical environment. Therefore, on account of their geometry, it is often difficult to clean and sterilize them. Moreover, the sterilization of optical waveguide cables preassembled with plug connectors results in residues on the optical waveguide ends, and these cause signal attenuation, which is not tolerable.

Therefore, it is the object of the invention to overcome the drawbacks of the prior art. In particular, it is the object of the invention to create a system and a method for producing an optical waveguide plug connection, which are designed specifically for sterile applications. It should also be possible here, inter alia, for the medical personnel to quickly and reliably produce such a connection, wherein both the quality of signal transmission and the requirements relating to patient safety have to be ensured.

These objects are achieved by a device for cleaning an optical waveguide end as claimed in claim 1, a method for cleaning an optical waveguide end as claimed in claim 6, a method for producing an optical waveguide plug connection as claimed in claim 7, an optical waveguide plug as claimed in claim 8 and a system for producing an optical waveguide plug connection as claimed in claim 10.

The invention relates to a device for cleaning an optical waveguide end, having a guide portion for receiving the optical waveguide end in a stable position and a rotatably mounted spool onto which a flexible cleaning element able to be wound. The guide portion and the spool are positioned relative to one another such that an optical waveguide end received by the guide portion is able to be pressed against the wound cleaning element. The cleaning element is able to be unwound from the spool such that different portions of the cleaning element are able to be applied to the optical waveguide end during unwinding.

The described arrangement provides a particularly simple and cost-effective device for cleaning an optical waveguide end which is easy to operate by a user. The device nevertheless ensures reliable and in each case thorough cleaning. On account of its simple structure, the device can be provided as a disposable article. It is thus disposed of after being used once, i.e. after the wound cleaning element has been unwound once. However, it would also be conceivable to provide the device to, in particular external, recycling.

In the described device, the guide portion may be configured to receive a plug pin, a pin holder or plug housing. In this embodiment, the optical waveguide end is preferably latchable indirectly in the guide portion. With such a guide portion, the device is compatible with preassembled optical waveguide cables in which at least one optical waveguide end sits in a plug pin which is usually held in turn by a pin holder. If the optical waveguide end is additionally latchable indirectly with the guide portion additionally via the plug pin or the pin holder, particularly reliable pressing of the optical waveguide end against the cleaning element is ensured.

An optical waveguide end received by the guide portion may be pressable, perpendicularly to the spool longitudinal axis, against the cleaning element wound onto the spool. An optimum cleaning result is usually achieved by this arrangement.

The guide portion may have a protective flap. Such a protective flap may be used to prevent the ingression of dust into the device, in particular prior to its use. When a plug pin, a pin holder or plug housing is introduced into the guide portion, protective flap can release this independently in particular by a folding movement.

The spool axle may be spring-mounted by spring elements, in particular in the pressing direction of the optical waveguide end. As a result of the spool axle being spring-mounted, the described device can be embodied such that the contact pressure of the optical waveguide end against the cleaning element is independent of the muscular force exerted on the cleaning element by the user. As a result, not only is damage to the optical waveguide end avoided, but a good cleaning result is ensured. The spring elements may be held in position by spring seats, which are particular pin-shaped.

The cleaning element may be a string or a cloth, in particular consisting of microfibers. As a result of the optional use of a string or cloth, the type of cleaning element can be coordinated with the particular waveguide end. Both strings and cloths can be wound very easily, optionally mechanically, onto the spool.

In the present connection, the term microfiber relates to a fiber having a fineness of less than 1.0 dtex; this means that 10 000 m of such a microfiber has a maximum weight of 1 g.

Preferably, the fineness of a microfiber used here is in a range between 0.3 and 0.8 dtex, preferably between 0.4 and 0.6 dtex. It goes without saying that a microfiber string used in this connection does not usually consist of a single fiber but is a string which is produced from microfibers. Microfiber fabrics and microfiber strings are extremely soft and dimensionally stable. Microfibers can be produced from synthetic or natural materials. In connection with the present invention, microfibers made of polyester, nylon, polyacrylic or cellulose can be used.

Since microfibers are so fine, a large number of them can be packed tightly together. Accordingly, many more fine fibers are required in order to produce a thread or a string, resulting in a larger surface area. Microfiber textiles are very resistant to pilling. This is of particular importance in the present connection since residue-free cleaning of the optical waveguide end has to be ensured. Microfibers are particularly suitable to this end, since only small amounts of a cleaning agent, if any, are required when they are used. A cleaning article made of microfibers can be constructed from a multifilament yarn.

The described cleaning device manages generally without the use of cleaning agents. However, the cleaning element can also be soaked in cleaning agent or its surface can be treated therewith. To this end, for example mixtures of water with alcohol and/or ammonia come into question. The alcohols can be methanol, ethanol, n-propanol, isopropanol, n-butanol, sec-butanol or tert-butanol. However, non-water-based cleaning agents, for example cleaning spirit, can also be used. The treatment of the cleaning element in the cleaning agent can in this case take place before or after the winding onto the spool.

The invention also relates to a method for cleaning an optical waveguide end, in particular using an above-described device, comprising the steps of:
 inserting an optical waveguide end into a guide portion,
 pressing the optical waveguide end against a cleaning element wound onto a spool,
 unwinding the cleaning element from the spool, in particular by exerting a pulling force, such that different portions of the cleaning element are applied to the optical waveguide end during unwinding,
 removing the optical waveguide end from the guide portion.

The method described represents a particularly simple and reliable method for cleaning an optical waveguide end. In particular by exerting a pulling force on the cleaning element, a user can easily unwind the latter from the spool, with the result that the cleaning of an optical waveguide end can be achieved in an efficient manner.

The invention furthermore relates to a method for producing an optical waveguide plug connection, comprising the steps of:
 sterilizing an optical waveguide end attached to an optical waveguide cable and preferably held by a plug pin,
 inserting the optical waveguide end into a plug housing, in order to obtain an optical waveguide plug, the optical waveguide end being anchored in the plug housing preferably via the pin holder for the plug pin,
 cleaning the optical waveguide end, in particular using an above-described method,
 plugging the optical waveguide plug into a compatible socket part.

The method described is used in particular in the medical field. Thus, an instrument provided with an optical waveguide cable, for example an endoscope, can be subjected to a regular cleaning and sterilization process. To this end, conventional mechanical cleaning methods and treatments in an autoclave can be used. Since the optical waveguide end is not surrounded by a complete optical waveguide plug during the latter, fewer problems with poorly accessible points on a plug housing or with the compatibility of the materials used with the sterilization agents arise, in particular during sterilization. In addition, a pin holder, preferably used in this connection, for a plug pin generally has a simple geometry compared with the plug housing.

In addition, the plug housing and the device for cleaning the optical waveguide end can be subjected to a sterilization process before they are used. Suitable for this purpose is for example treatment with ethylene oxide, which is highly suitable in particular with regard to the geometric complexity of these parts.

The final assembly of the plug takes place only after cleaning and sterilization. The cleaning of the optical waveguide end can take place before or after this final assembly process.

The invention furthermore relates to an optical waveguide plug for an optical waveguide plug connection, having a plug pin, the plug pin being insertable into a plug housing via a pin holder. The pin holder consists of a corrosion-resistant metal, in particular of a stainless steel, and has locking means for locking to the plug housing. As a result of the division of the optical waveguide plug into a plug pin with a pin holder, for the one part, and a plug housing, for the other part, the cleaning and sterilization of the optical waveguide end is considerably simplified. The pin holder, and preferably also the plug pin, consist of high-grade, corrosion-resistant materials which can be subjected to cleaning and sterilization. By contrast, the plug housing is constructed of inexpensive materials and is generally provided for single use. An optical waveguide plug embodied in such a way allows particularly cost-effective and easy use in the medical field.

The locking means on the above-described pin holder can be part of a bayonet lock. Such a bayonet lock allows particularly quick and reliable fastening of the pin holder in the plug housing. In order to simplify the cleaning and sterilization process for the pin holder as far as possible, the parts of the bayonet lock that are attached thereto are generally embodied in a comparatively simple manner. By way of the bayonet lock, the plug pin can be spring-mounted, wherein the spring mechanism is preferably accommodated in the plug housing. As an alternative to the bayonet lock, it is also possible to use a spring lock.

The present invention furthermore relates to a system for producing an optical waveguide plug connection, in particular using an above-described method, comprising:

a device for cleaning an optical waveguide end as described above, an optical waveguide plug, in particular as described above.

Such a system, in conjunction with an optical waveguide cable having an optical waveguide end which is preassembled with a plug pin and a pin holder, provides a very reliable possibility of producing an optical waveguide plug connection in a sterile area.

Said system can be packaged in a display pack, in particular in what is known as a blister pack. The blister pack in this case comprises a plastic film molding into which the system according to the invention, or parts thereof, are inserted. The plastic film molding is fixed to a backing. This backing can consist of paper, board, cardboard, plastic or metal foil, in particular aluminum foil, or combinations thereof. The plastic film molding can be connected to the backing by a welded, clamped or stapled connection. For the present application, a welded connection in particular is advantageous, since it allows sterile packaging of the system. Separate packaging for the plug housing and the cleaning device, for example in hermetically sealed bags, is also conceivable.

Figure 2:
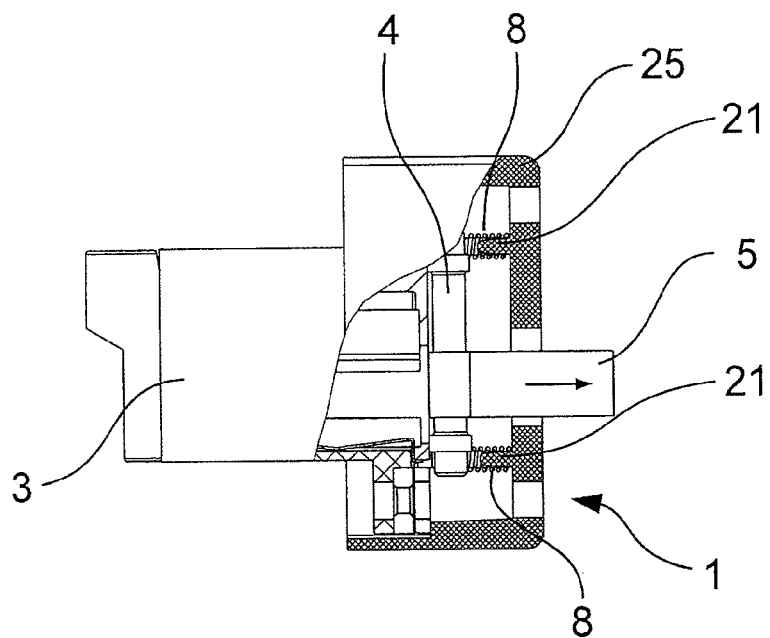
Figure 3:
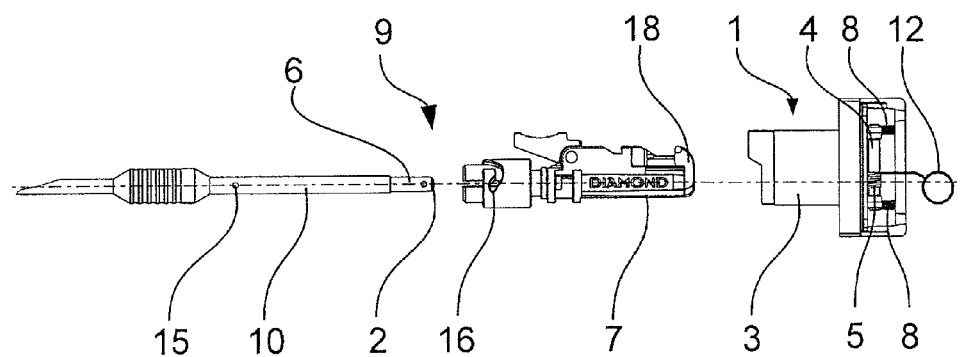
Figure 4:
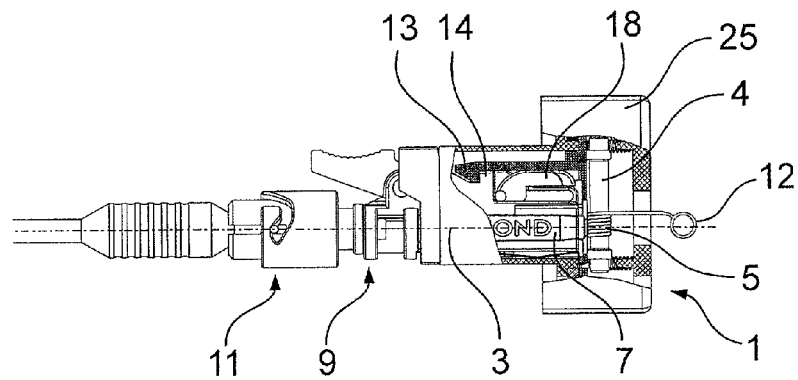
Figure 5:
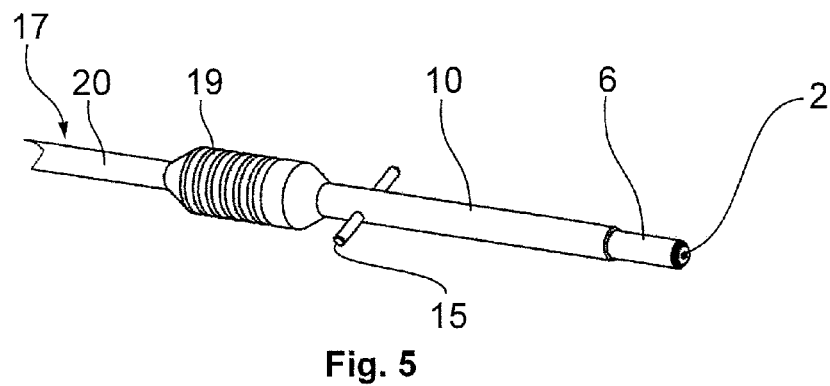
Figure 6:
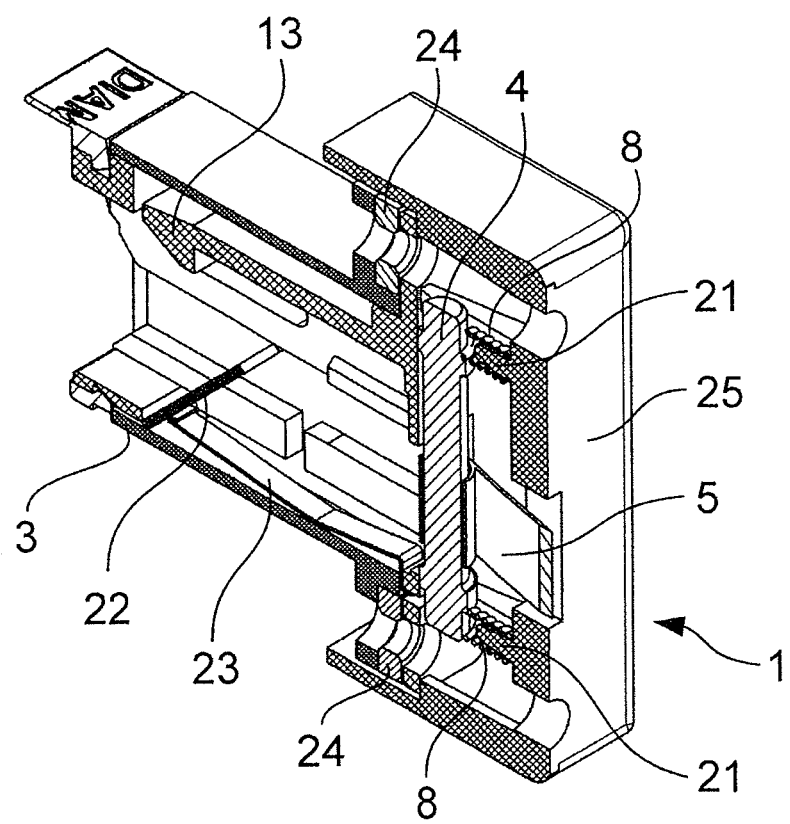

Further advantages and individual features of the invention can be gathered from the following description of an exemplary embodiment and from the drawings, in which, schematically:

FIG. 1: shows a partial section through a device according to the invention for cleaning an optical waveguide end;

FIG. 2: shows a partial section through an alternative exemplary embodiment of a device according to the invention for cleaning an optical waveguide end;

FIG. 3: shows an overview illustration of a system according to the invention for producing an optical waveguide plug connection;

FIG. 4: shows an assembled optical waveguide plug according to FIG. 2, which is used in a device for cleaning an optical waveguide end according to FIG. 1;

FIG. 5: shows an enlarged illustration of one end of an optical waveguide cable, which is preassembled with a plug pin having a pin holder FIG. 6: shows a perspective sectional view of an inventive device for cleaning an optical waveguide according to FIG. 2.

As is apparent from FIG. 1, a device 1 according to the invention for cleaning an optical waveguide end 2 comprises a housing 25 as well as a guide portion 3 for receiving the optical waveguide end 2 connected to the housing. Furthermore, the device comprises a spool 4 onto which a cleaning element 5 is wound. In the exemplary embodiment shown, the spool 4 is spring-mounted via the spring elements 8. The spring elements 8 are each held in position by spring seats 21. The cleaning element 5 can be unwound from the spool 4 by exerting a pulling force on the cleaning element 5 using the strap 12 provided therefor.

FIG. 2 shows an alternative exemplary embodiment of a device according to the invention for cleaning an optical waveguide end, in which the cleaning element 5 is embodied as a cloth.

In FIG. 3, the structure of an optical waveguide plug 9 according to the invention is more clearly apparent. The optical waveguide end 2 is preassembled with a plug pin 6 and a pin holder 10. These can be inserted into a plug housing 7. The illustrated plug housing 7 is a modified version of the known E-2000® system. It can be seen that the optical waveguide end 2 held by the plug pin 6 is covered by a protective cover 18 before being inserted into the guide portion 3. Both the pin holder 10 and the plug housing 7 have locking means 15, 16 which are part of a bayonet lock 11. In the present exemplary embodiment, the plug housing 7 is embodied such that it is receivable by the guide portion 3 of a device 1 for cleaning an optical waveguide end 2.

In FIG. 4, the assembled optical waveguide plug 9 according to FIG. 2 has been inserted into a device 1 for cleaning the optical waveguide end 2. Both the device 1 and the plug 9 have latching elements 13 and 14 in order to allow the plug housing 7 to be latched in the guide portion 3. It can be seen that, as a result of the insertion of the plug housing 7 into the guide portion 3, the protective cover 18 is removed from the optical waveguide end 2. In the E-2000® system, this takes place automatically. The optical waveguide end 2 then protrudes slightly from the plug housing 7, thereby allowing cleaning with the cleaning element 5 wound onto the spool 4.

FIG. 5 reveals details of an optical waveguide cable 17 preassembled with a plug pin 6 having a pin holder 10. In the exemplary embodiment shown, the pin holder 10 has a gripping surface 19 in the transition region to the cable sheath 20. This also ensures a sealed connection between the pin holder 10 and cable sheath 20. Diametrically opposed tabs or studs on the pin holder 10, which are preferably formed integrally with the latter, serve as locking means 15.

In FIG. 6 further details of an inventive device according to FIG. 2 are given. It can be seen that the guide portion 3 has a protective flap 22, which is biased by a leaf spring 23. The protective flap 22 serves to prevent the ingression of dust into the device 1 before use thereof. Upon insertion of a plug 9 into the guide section 3, the protective flap 22 flaps back independently to release the guide portion 3. Nuts 24 are impressed into the guide section 3, with which it can be screwed to the housing 25 and the latching element 13. Through this screw connection (screws in FIG. 6 not shown), the leaf spring 23 also is held.

The invention claimed is:

1. A device for cleaning an optical waveguide end, having a guide portion for receiving the optical waveguide end in a stable position and a rotatably mounted spool onto which a flexible cleaning element is wound, wherein the guide portion and the spool are positioned relative to one another such that an optical waveguide end received by the guide portion is able to be pressed against the wound cleaning element and the cleaning element is able to be unwound from the spool such that different portions of the cleaning element are able to be applied to the optical waveguide end during unwinding, and wherein the guide portion is configured to receive a plug pin or a pin holder or a plug housing (7).

2. The device as claimed in claim 1, wherein the optical waveguide end is latchable indirectly in the guide portion.

3. The device as claimed in claim 1, wherein the optical waveguide end received by the guide portion is pressable, perpendicularly to the spool longitudinal axis, against the cleaning element wound onto the spool.

4. The device as claimed in claim 1, wherein the spool axle is spring-mounted by spring elements.

5. The device as claimed in claim 4, wherein the spool axle is spring-mounted in the pressing direction of the optical waveguide end.

6. The device as claimed in claim 1, wherein the cleaning element is a string or a cloth.

7. The device as claimed in claim 6, wherein the string or cloth consists of microfibers.

8. A method for cleaning an optical waveguide end, using a device as claimed in claim 1, comprising the steps of:
inserting the optical waveguide end into the guide portion,
pressing the optical waveguide end against the cleaning element wound onto the spool,
unwinding the cleaning element from the spool, such that different portions of the cleaning element are applied to the optical waveguide end during unwinding, and
removing the optical waveguide end from the guide portion.

9. A method for producing an optical waveguide plug connection, comprising the steps of:
sterilizing an optical waveguide end attached to an optical waveguide cable and held by a plug pin,
inserting the optical waveguide end into a plug housing, in order to obtain an optical waveguide plug, the optical waveguide end being anchored in the plug housing via the pin holder for the plug pin,
cleaning the optical waveguide end using a method as claimed in claim 8, and
plugging the optical waveguide plug into a compatible socket part.

10. The system as claimed in claim 9, wherein the locking means are part of a bayonet lock.

11. A system for producing an optical waveguide plug connection, comprising:
a device for cleaning an optical waveguide end as claimed in claim 1, and
an optical waveguide plug having a plug pin, the plug pin being insertable into a plug housing via a pin holder, and the pin holder consisting of a corrosion-resistant metal, and the pin holder having locking means for locking to the plug housing.

12. A method for cleaning an optical waveguide end comprising the steps of:
inserting the optical waveguide end into a guide portion configured to receive a plug pin or a pin holder or a plug housing (7),
pressing the optical waveguide end against a cleaning element wound onto a spool,
unwinding the cleaning element from the spool, such that different portions of the cleaning element are applied to the optical waveguide end during unwinding,
removing the optical waveguide end from the guide portion.

13. A method for producing an optical waveguide plug connection, comprising the steps of:
sterilizing an optical waveguide end attached to an optical waveguide cable and held by a plug pin;
inserting the optical waveguide end into a plug housing, in order to obtain an optical waveguide plug, the optical waveguide end being anchored in the plug housing via the pin holder for the plug pin;
cleaning the optical waveguide end by;
inserting the optical waveguide end into a guide portion,
pressing the optical waveguide end against a cleaning element wound onto a spool,
unwinding the cleaning element from the spool, such that different portions of the cleaning element are applied to the optical waveguide end during unwinding, and
removing the optical waveguide end from the guide portion; and
plugging the optical waveguide plug into a compatible socket part.

* * * * *